US012780631B2

(12) United States Patent
Habedank et al.

(10) Patent No.: US 12,780,631 B2
(45) Date of Patent: Nov. 3, 2026

(54) WHEEL ARM FORKLIFT TRUCK, PREFERABLY AS AN AUTOMATED GUIDED VEHICLE

(71) Applicant: K. HARTWALL GMBH, Buchholz i.d.N (DE)

(72) Inventors: Gerhard Habedank, Seevetal (DE); Frank Haltermann, Heidenau (DE)

(73) Assignee: K. Hartwall GmbH, Heidenau (DE)

(*) Notice: Subject to any disclaimer, the term of this patent is extended or adjusted under 35 U.S.C. 154(b) by 745 days.

(21) Appl. No.: 18/017,309

(22) PCT Filed: Jun. 14, 2021

(86) PCT No.: PCT/EP2021/065993
§ 371 (c)(1),
(2) Date: Jan. 20, 2023

(87) PCT Pub. No.: WO2022/017688
PCT Pub. Date: Jan. 27, 2022

(65) Prior Publication Data

US 2023/0286788 A1 Sep. 14, 2023

(30) Foreign Application Priority Data

Jul. 22, 2020 (DE) ......................... 102020119276.2

(51) Int. Cl.
*B66F 9/07* (2006.01)
*B62D 5/04* (2006.01)
(Continued)

(52) U.S. Cl.
CPC ........ *B66F 9/07568* (2013.01); *B62D 5/0418* (2013.01); *B62D 7/142* (2013.01)

(58) Field of Classification Search
CPC ... B66F 9/07568; B62D 5/0418; B62D 7/142; B62D 7/1509
See application file for complete search history.

(56) References Cited

U.S. PATENT DOCUMENTS 4,411,329 A * 10/1983 Stedman ................. B66F 9/122 180/257
9,371,217 B1 * 6/2016 DePumpo ............... B66F 9/075
(Continued)

FOREIGN PATENT DOCUMENTS

AT 509305 A1 7/2011
CN 109205523 A 1/2019
(Continued)

OTHER PUBLICATIONS

International Search Report for PCT/EP2021/065993; Sep. 2, 2021; 6 pgs.

*Primary Examiner* — Valentin Neacsu
*Assistant Examiner* — Marlon A Arce
(74) *Attorney, Agent, or Firm* — Perilla Knox & Hildebrandt LLP

(57) ABSTRACT

The present invention relates to a wheel arm forklift truck (1), preferably as an automated guided vehicle, comprising a front end (10*c*) having at least, preferably exactly, two steerable drive rollers (11*a*, 11*b*); comprising at least one first wheel arm (10*a*) which extends in a straight line away from the front end (10*c*) and is fixedly connected to the front end (10*c*), wherein the first wheel arm (10*a*) has at least, preferably exactly, one first roller (12*a*); and comprising at least one first fork arm (15*a*) which is located above the first wheel arm (10*a*) in the vertical direction (Z) and is designed to be raised and lowered in the vertical direction (Z). The wheel arm forklift truck (1) is characterized in that the first roller (12*a*) of the first wheel arm (10*a*) is steerable through at least 90°.

11 Claims, 5 Drawing Sheets

(51) Int. Cl.
*B62D 7/14* (2006.01)
*B66F 9/075* (2006.01)

(56) References Cited

U.S. PATENT DOCUMENTS

| | | | | |
|---|---|---|---|---|
| 9,751,738 | B2 * | 9/2017 | Keller | B62D 5/12 |
| 12,145,667 | B2 * | 11/2024 | Keller | B66F 9/07568 |
| 2002/0100643 | A1 * | 8/2002 | De Leeuw | B66F 9/07568 187/222 |
| 2007/0289798 | A1 | 12/2007 | Kaufmann | |
| 2010/0181136 | A1 * | 7/2010 | Swasey | G05D 1/0265 29/428 |
| 2011/0168474 | A1 | 7/2011 | Checketts et al. | |
| 2016/0002016 | A1 * | 1/2016 | Mcvicar | B66F 9/07568 254/2 R |
| 2019/0248233 | A1 * | 8/2019 | Calleija | B60B 37/10 |
| 2020/0406935 | A1 * | 12/2020 | Yamanouchi | B60W 60/00253 |

FOREIGN PATENT DOCUMENTS

| | | | |
|---|---|---|---|
| DE | 3711662 | A1 | 10/1988 |
| DE | 20114962 | U1 | 3/2002 |
| DE | 102004055282 | A1 | 6/2006 |
| DE | 102012110988 | A1 | 5/2014 |
| DE | 102013019726 | A1 | 5/2015 |
| DE | 102019102182 | A1 | 7/2020 |
| IE | S80733 | B2 | 12/1998 |
| IE | S980613 | A2 | 12/1998 |
| WO | 03059799 | A1 | 7/2003 |
| WO | 2003059799 | A1 | 7/2003 |
| WO | 2014075921 | A1 | 5/2014 |
| WO | 2018013698 | A1 | 1/2018 |
| WO | 2018136987 | A1 | 8/2018 |

* cited by examiner

WHEEL ARM FORKLIFT TRUCK, PREFERABLY AS AN AUTOMATED GUIDED VEHICLE

The present invention relates to a wheel arm forklift truck, preferably as an automated guided vehicle, according to the preamble of claim 1.

So-called industrial trucks have long been used for the horizontal transportation of goods, i.e. for transporting goods on the horizontal plane or at ground level. This applies to outdoor areas as well as to areas within warehouses, production facilities and the like. Industrial trucks can also be referred to as forklift trucks or floor handling equipment.

Industrial trucks include manual devices, such as pallet trucks, which are used in particular for transporting pallets, grid boxes and comparable conveying aids. A transport pallet and the like can accommodate the goods to be transported on or within itself, so that in particular small goods or goods containers can be handled and transported together.

The simplest embodiment of such a pallet truck is the manual pallet truck, which has no drives of its own and has to be pulled or pushed by a person and raised from the floor by muscular force. Such a manual pallet truck consists essentially of two flat fork arms running parallel to one another, which are usually elongate and spaced apart parallel to one another in such a way that a standardized transport pallet, grid box and the like can be accommodated by the pair of fork arms together. The two fork arms are connected to one another in a fixed manner at their ends and can also be referred to as fork prongs or simply as prongs. In the connection region of the manual pallet truck, there is usually at least one steerable roller, possibly also a pair of steerable rollers, which can also be referred to as a steering roller. A non-steerable roller is usually arranged on each of the tips of the two fork arms as a roller; these can also be referred to as load rollers.

By means of a handle in the connection region of the manual pallet truck, the manual pallet truck can be pulled or pushed and steered by a person. On the other hand, by means of the handle used as a lever a hydraulic pump can be pumped up in order to adjust the height of the two fork arms parallel to the ground by means of a hydraulic lifting cylinder and a linkage via the load rollers and the steering roller, and thereby to raise from the ground the load accommodated by the fork arms, for example in the form of a transport pallet, and move it therewith. By means of an operating element on the handle, the pressure of the hydraulic lifting cylinder can be released again by means of a hydraulic valve, and the supported load can thereby be deposited again on the ground.

Pallet trucks of this type, which have to be raised and lowered or pulled and pushed manually by a person, can usually raise the load to be transported only by a few centimeters above the ground. They are therefore also referred to as a low-lift pallet trucks, since they are only suitable for a ground-level transportation of loads.

Such low-lift pallet trucks thus always have in each case a load roller with a fixed orientation in the longitudinal direction at the tip of each fork arm and a rotatable steering roller or a rotatable steering roller pair in the connection region. The steering, i.e. the directionality of the rotatable steering roller or the rotatable steering roller pair about the vertical axis, is always caused by the movement or by the force applied by the user by means of the handle or lever.

In order to facilitate the work of an operator of such manual pallet trucks, various further developments provided with drives are known. For example, in the connection region of the manual pallet truck, an electrical drive with rechargeable electrical energy storage can be provided in order to assist the person at least during the movement on the ground and in completing the movement, i.e. in order to be able to move the manual pallet truck on the ground. Depending on the type of drive, such pallet trucks can be referred to as electrical walking devices or as electrical standing devices.

In addition, a hydraulic pump or an electrical drive can be operated for raising the fork arms. As a result, the supported load can be raised in the vertical direction or in the height direction, for example in shelves of a high-bay warehouse or onto the load bed of an industrial vehicle (truck), which can significantly expand the possibilities of use of such industrial trucks compared to the previously described manual pallet trucks. Such industrial trucks can therefore also be referred to as high-lift pallet trucks.

In contrast to forklift trucks which are usually equipped with three or four wheels, which are arranged under the chassis, and the fork arms of which extend outside the dimensions of the chassis, such high-lift pallet trucks have so-called wheel arms, which extend forwardly from a front end in the longitudinal direction and like manual pallet trucks each house at the tip a load roller with a fixed orientation in the longitudinal direction. The forks are arranged in the vertical direction above the wheel arms and are aligned with the wheel arms. The fork arms can be lowered onto the wheel arms and surround them at least laterally in order to keep the combined height of the wheel arms and fork arms so low that the loads, such as transport pallets, can still be lifted from below.

Since the front wheels of such high-lift pallet trucks are arranged in the wheel arms thereof below the fork arms and thus below the load, in the case of a wheel arm forklift truck, a counterweight can be dispensed with—in contrast to a forklift truck. The center of gravity of the load thus lies in between the wheels of the high-lift pallet truck. As a result, such high-lift pallet trucks can be implemented very compactly and, in particular, have the width of the loads to be transported such as, for example, the dimensions of a transport pallet. Such high-lift pallet trucks can be referred to as wheel arm forklift trucks, as spreader stackers or as pedestrian trucks.

All of the above-described high-lift pallet trucks have in common the use of load rollers with a fixed orientation in the longitudinal direction at the tips of the wheel arms and of at least one driven steering roller or at least one driven steering roller pair in the front end. The steering, i.e. the directionality of the driven steering roller or the driven steering roller pair about the vertical axis, is still caused by the movement or by the force applied by the user by means of the handle or by means of the lever or possibly by means of a steering wheel. However, the forward movement in the horizontal plane is carried out by means of the driven steering roller or the driven steering roller pair. The raising and lowering of the fork arms relative to the wheel arms also takes place by means of a further drive in the front end.

The disadvantage with the above-described high-lift pallet trucks is that although they can turn in a comparatively small space, sufficient space must still be present on the ground to allow a rotational movement. This space requirement can increase if, in addition to a transport pallet or the like, the dimensions of which correspond to the outer dimensions of the high-lift pallet truck, loads have to be transported which project laterally beyond the outer dimensions of the high-lift pallet truck. This can require correspondingly wide paths or aisles, for example between several shelves or the like, and thus increase the space requirement of the storage area, the production area and the like.

It is also disadvantageous that the execution of the rotational movement of such high-lift pallet trucks can take a lot of time.

Industrial trucks are therefore known which, due to the steerability of all of their rollers, which are designed as drive rollers, can move laterally forwards and backwards both in the longitudinal direction and in the transverse direction. Such industrial trucks can therefore also be referred to as four-way industrial trucks. In other words, all rollers can roll over the ground by means of drives, and all rollers can be rotated about their respective vertical axis by means of further drives and, as a result, they can be directed in any desired direction in the horizontal plane, which can be referred to as steering. This can avoid the execution of a rotational movement of the industrial truck as a whole as described above and thereby save time, although the orientation or steering of all rollers must be undertaken instead. This can also increase the movement possibilities in the horizontal plane.

A vehicle in the form of a forklift truck with a pair of wheels is known from IE S80733 B2, each of whose wheels is steerable by a corresponding hydraulic cylinder, so that each wheel is rotated by an angle determined by the position of the piston head in the corresponding cylinder, each cylinder having a full passage end and a rod end, wherein one of the full passage ends and the rod end of one of the cylinders are connected to one of the full passage ends and the rod end of the other cylinder. A third pair of wheels is provided in the connecting region of the forklift truck. All three pairs of wheels can be oriented laterally so that a purely lateral movement in the horizontal plane is possible.

WO 2014/075 921 A1 describes a steering system for an industrial truck, in which at least two hydraulically steerable wheel sets are provided, in which the wheel sets are each steerable by means of a hydraulic linear motor which is designed as a synchronous cylinder and the at least two synchronous cylinders are operatively connected to one another. An industrial truck with a corresponding steering system is also described. The industrial truck has at least one further wheel set. For example, it can be a three-wheeled or four-wheeled vehicle.

In industrial trucks, it is thus known to provide a steerability of all rollers, wheels or wheel pairs, i.e. each roller can be rotated, directed, or steered about its vertical axis in the horizontal plane relative to the frame or the like of the industrial truck at least by 90°, in order to enable a movement perpendicular thereto, i.e. purely lateral in the transverse direction, in addition to a forward/backward movement in the longitudinal direction, and thus enable a four-way movement in the horizontal plane. For this purpose, the rollers are each hydraulically operatively connected to one another so that they can be rotated, directed or steered together by means of actuation.

A disadvantage of this type of steering of the wheels, however, is that this takes place laterally in relation to the wheels by means of hydraulic cylinders. The steering can thus only take place within a very restricted angular range of less than 180°.

WO 03/059799 A1 describes a four-way forklift truck consisting of a chassis with two front wheels and one rear wheel. A corresponding hydrostatic motor selectively drives each wheel in one of two opposing rotational directions. The stacker includes a control device to put the stacker into a carousel operation in which the three wheels are set in respective steering angles in which their axes of rotation intersect at an essentially common vertical axis at the same distance from each wheel and all three wheels are driven.

WO 2018-136-987 A1 relates to a chassis for transport devices with a guide ring and a wheel carrier which can be pivoted in the guide ring about a substantially perpendicular main axis of rotation and on which two wheels rotatable about a common axis of rotation are arranged. In the guide ring, an inner ring is mounted so as to be pivotable about the main axis of rotation by means of a pivot bearing, and the wheel carrier is pivotably mounted about at least one pivot bearing about a pivot axis arranged substantially perpendicularly to the main axis of rotation. The two wheels can be driven independently of one another. A corresponding transport device has a plurality of such chassis, preferably three or four chassis, wherein the common axes of rotation can be aligned relative to one another.

Due to the arrangement of the two electric drives within the footprint of the pivotable wheel carrier, only very small and weak electrical drives can be used. For this reason the chassis of WO 2018/136-987 A1 can only be used in transport devices such as, for example, an AGV (automated guided vehicle) or an FTS (driverless transport system) or FTF (driverless transport vehicle), which are intended to transport only comparatively light loads.

DE 10 2013 019 726 A1 describes a vehicle, in particular an AGV or an FTS, with a frame and at least one steering unit, in particular for moving on a travel surface, wherein the or each steering unit is mounted rotatably on the frame of the vehicle by means of a rotating ring. Each steering unit has two drive wheels in each case with a motor. If steering rollers are additionally provided, each steering roller is driven by a further electric motor.

The disadvantage of industrial trucks whose rollers are both steerable and drivable is that this can give rise to corresponding costs and/or require corresponding installation space. The latter can be disadvantageous in particular in the case of rollers which are arranged in the fork arms or wheel arms. Furthermore, this can increase the weight of the industrial truck and thus also its energy consumption or require the use of more powerful drives.

It is an object of the present invention to provide a wheel arm forklift truck of the type described above as a four-way industrial truck. In particular, the four-way wheel arm forklift truck should be able to be implemented such that it is more cost-effective, more space-saving, lighter, with lower energy consumption and/or with less powerful drives than previously known wheel arm forklift trucks. In particular, lateral movements should be implemented with a comparatively high precision and/or robustness. In particular, said truck is to be implemented as an AGV or FTF. At least an alternative to known four-way industrial trucks or wheel arm forklift trucks is to be provided.

The object is achieved according to the invention by a wheel arm forklift truck with the features of claim 1. Advantageous developments are described in the dependent claims.

The present invention thus relates to a wheel arm forklift truck with a front end with at least, preferably exactly, two steerable drive rollers, comprising at least one first wheel arm, which extends in a straight line away from the front end and is fixedly connected to the front end, wherein the first wheel arm has at least, preferably exactly, one first roller, and comprising at least one first fork arm which is arranged in the vertical direction above the first wheel arm, and is designed to be raised and lowered in the vertical direction.

The wheel arm forklift truck according to the invention is characterized in that the first roller of the first wheel arm is steerable through at least 90°.

A roller represents in this case a roller which is movably mounted on the first wheel arm and which can roll over a ground in one direction and can also rotate about its vertical axis. A roller can also be referred to as a steering roller, in contrast to a fixed roller. In this case, a roller can be guided in a passive manner, i.e. it can only be rotated about its vertical axis when the roller is moved along with an object such as the wheel arm forklift truck. In contrast to a drive roller, a roller also does not have a drive that enables it to roll over the ground. This rolling of the roller over the ground can also take place only in conjunction with an object, such as said wheel arm forklift truck.

According to the invention, however, the first roller is designed to be actively steerable by at least 90°. Here, as already described above, steerable means that the orientation, directionality or angular position of the first roller about its vertical axis can be adjusted, which axis extends in the vertical direction, by means of a drive, in a targeted manner relative to the frame or the housing of the first wheel arm. In other words, the first roller can be brought by means of a drive into a predetermined angular position relative to the longitudinal direction of extension of the first wheel arm or the longitudinal direction. This predetermined angular position can lie at least within an angle between 0° and 90° relative to the longitudinal direction of extension of the first wheel arm or the longitudinal direction.

In this case, the present invention is based on the knowledge that, in the case of wheel arm forklift trucks, no rotatable or even steerable rollers in the wheel arms have been known so far. Wheel arm forklift trucks are thus not available at all as four-way industrial trucks. If in certain industrial trucks rotatable or even steerable rollers are known, as described in the introduction, those trucks are not wheel arm forklift trucks. In such cases, only steerable drive rollers are disclosed, which, however, cause additional costs due to the use of drives and an increased space requirement. However the space or installation space is not available at all in the wheel arms of wheel arm forklift trucks since the wheel arms and fork arms are to be designed to be flat so as to be able to lift standardized transport pallets and the like in the vertical direction from below.

According to the invention, the first roller of the first wheel arm is therefore provided to be steerable, so that the wheel arm forklift truck can be moved obliquely as well as transversely to the longitudinal direction by the orientation of both the two drive rollers of the front end and the first roller of the first wheel arm. This can enable four-way mobility even for wheel arm forklift trucks.

In particular, the two drive rollers of the front end and the first roller of the first wheel arm can also be directed in other angular positions between 0°, i.e. in the longitudinal direction, and 90°, i.e. in the transverse direction perpendicular to the longitudinal direction. In the case of an identical orientation of the two drive rollers of the front end and of the first roller of the first wheel arm, the wheel arm forklift truck can be moved in a straight line in the horizontal plane. If the two drive rollers of the front end and the first roller of the first wheel arm are oriented at different angles, corresponding arcuate movements in the horizontal plane can be carried out by the wheel arm forklift truck.

In any case, it is thereby possible to increase the possible movements and uses of wheel arm forklift trucks. In particular, a directionally precise movement of a four-way industrial truck can be made possible. This movement can in particular be particularly robust and stable for example when ground unevennesses and the like occur.

The orientation of the steerable drive rollers of the front end and of the first roller of the first wheel arm can the effected by suitable electrical, hydraulic or other drives. This can be specified or controlled by a control unit of the wheel arm forklift truck.

The wheel arm forklift truck according to the invention is preferably designed as an autonomous guided vehicle, i.e. as an independently movable wheel arm forklift truck. As a result, the functions of AGVs can be combined with the previously described properties of a four-way wheel arm forklift truck.

According to one aspect of the invention, the first roller of the first wheel arm is designed to be steerable through 360°. This can increase the number of possible movements. In particular, a change in the orientation or the steering direction can thereby take place more flexibly and or more quickly than in the case of an directionality which permits only a range of 90°.

According to a further aspect of the invention, the first roller of the first wheel arm is arranged on the end of the first wheel arm remote from the front end. This can increase the stability of the wheel arm forklift truck when carrying loads. This is particularly true when the load is raised by the first fork arm in the vertical direction.

According to a further aspect of the invention, the first roller of the first wheel arm has an electric motor, which is designed to rotate a roller mount of the first roller, preferably via a clutch, by means of a gear unit, preferably by means of a worm gear unit or by means of a bevel gear unit, about the vertical direction as a vertical axis, wherein the roller mount has at least one roller. This can enable the implementation of the previously described steering capability of the first roller. This can take place effectively and at the same time compactly by means of an electric motor and in particular by means of a worm gear unit.

According to a further aspect of the invention, the roller mount has at least, preferably exactly, one pair of rollers, the roller elements of which are designed and arranged axially symmetrical to the vertical axis. This can increase the contact surface of the first roller of the first wheel arm and thus reduce the force per surface area, which is to be borne by each individual roller element. This can favor the durability or the longevity of the roller elements. In particular, by means of the axially symmetric arrangement of two roller elements in relation to the vertical axis, both roller elements can roll around the vertical axis on the ground, in a similar way to turntable steering. This can facilitate the rotation of the roller elements about the vertical axis.

According to a further aspect of the invention, the first roller of the first wheel arm has at least one first position sensor, preferably as an incremental encoder, which is designed to detect a rotational position of the roller mount, wherein the first roller preferably has at least one second position sensor which is designed to detect the rotational position of the roller mount. Such position detection or rotational position detection can allow a controlled or regulated steering of the first roller of the first wheel arm or its roller elements. This redundancy given by two position sensors enables, even in the event of failure or malfunction of a position sensor, the operation of the wheel arm forklift truck, at least temporarily. In particular, such a redundancy of the position detection or rotational position detection can be necessary for safety reasons in order to be able to securely and reliably detect the direction of travel or the direction of movement of the wheel arm forklift truck. This can be necessary or prescribed in particular for personal safety when the wheel arm forklift truck is used as AGV.

According to a further aspect of the invention, the wheel arm forklift truck has at least, preferably exactly, one second wheel arm which extends in a straight line away from the front end parallel to the first wheel arm and which is fixedly connected to the front end, and the wheel arm forklift truck has at least, preferably exactly, one second fork arm which is arranged parallel to the first fork arm in the vertical direction above the second wheel arm and is designed to be raised and lowered together with the first fork arm in the vertical direction, wherein the second wheel arm has at least, preferably exactly, one second roller, wherein the second roller of the second wheel arm is designed to be rotatable through at least 90°.

As a result, transportation of loads with two fork arms is made possible. On the other hand, a second roller can be provided in the second wheel arm in order also to give rolling support to the second wheel arm on the ground. This second roller of the wheel arm forklift truck that can be provided in the second wheel arm so as to be rotatable by at least 90°, still allows an orientation of the wheel arm forklift truck as described above at an angle and in particular perpendicular to the longitudinal direction and thus to create a four-way wheel arm forklift truck that can be moved over the entire surface also in the case of two fork arms and two wheel arms. For this purpose, it may be sufficient to provide the second roller of the second wheel arm to be only rotatable about its vertical axis, i.e. to allow it to be passively directed. Alternatively, the second roller of the second wheel arm can be steered similarly to the first roller of the first wheel arm, i.e., it can be actively directed, as will be described in more detail further below.

According to a further aspect of the invention, the second roller of the second wheel arm is designed to be rotatable through 360°. This can increase the movement possibilities, as already described above with regard to the first roller of the first wheel arm.

According to a further aspect of the invention, the second roller of the second wheel arm is designed to be steerable through at least 90°. This can also enable a steering of the second roller of the second wheel arm as described above with regard to the first roller of the first wheel arm. As a result, in particular the steering of the second roller of the second wheel arm can be achieved more quickly and or in a more defined manner than in the case of a roller which co-rotates only passively.

According to a further aspect of the invention, the second roller of the second wheel arm is designed to be steerable through 360°. This can combine the steerability with the movements which can result from a complete rotation capacity about the vertical axis, as already described above.

According to a further aspect of the invention, the second roller of the second wheel arm is arranged on the end of the second wheel arm pointing away from the front end. This can make use of the corresponding previously described properties of the first roller of the first wheel arm also in the second roller of the second wheel arm.

According to a further aspect of the invention, the two steerable drive rollers are not arranged in alignment with one another in the transverse direction. In other words, the two steerable drive rollers are arranged in the longitudinal direction such that they have an offset relative to one another in the longitudinal direction, i.e., when viewed in the transverse direction, the two steerable drive rollers lie on different axes, which are oriented on the one hand perpendicular to the longitudinal direction and on the other hand parallel to one another, i.e., they are not congruent. This can promote the stability of a movement in the lateral direction, i.e. improve or increase this stability compared to an aligned orientation.

According to a further aspect of the invention, the two rollers of the two wheel arms are not arranged in alignment with one another in the transverse direction. In other words, the two rollers of the two wheel arms have an offset relative to one another in the longitudinal direction. This can promote the stability of a movement in the lateral direction.

According to a further aspect of the invention, the first steerable drive roller of the two steerable drive rollers is aligned with the first roller of the first wheel arm in the longitudinal direction, and the second steerable drive roller of the two steerable drive rollers is aligned with the second roller of the second wheel arm in the longitudinal direction. This can promote the stability of a movement in the longitudinal direction.

An exemplary embodiment and further advantages of the invention are illustrated in a purely schematic manner and in detail below in connection with the following figures. In particular:

FIGS. 1 to 6 are based on Cartesian coordinates. A longitudinal direction X is shown, which can also be referred to as depth X or as length X. A transverse direction Y, which can also be referred to as width Y, extends 5 perpendicular to the longitudinal direction X. A vertical direction Z, which can also be referred to as height Z, extends perpendicular both to the longitudinal direction X and to the transverse direction Y. The longitudinal direction X and the transverse direction Y together form the horizontal X, Y, which can also be referred to as horizontal plane X, Y.

Figure 7:
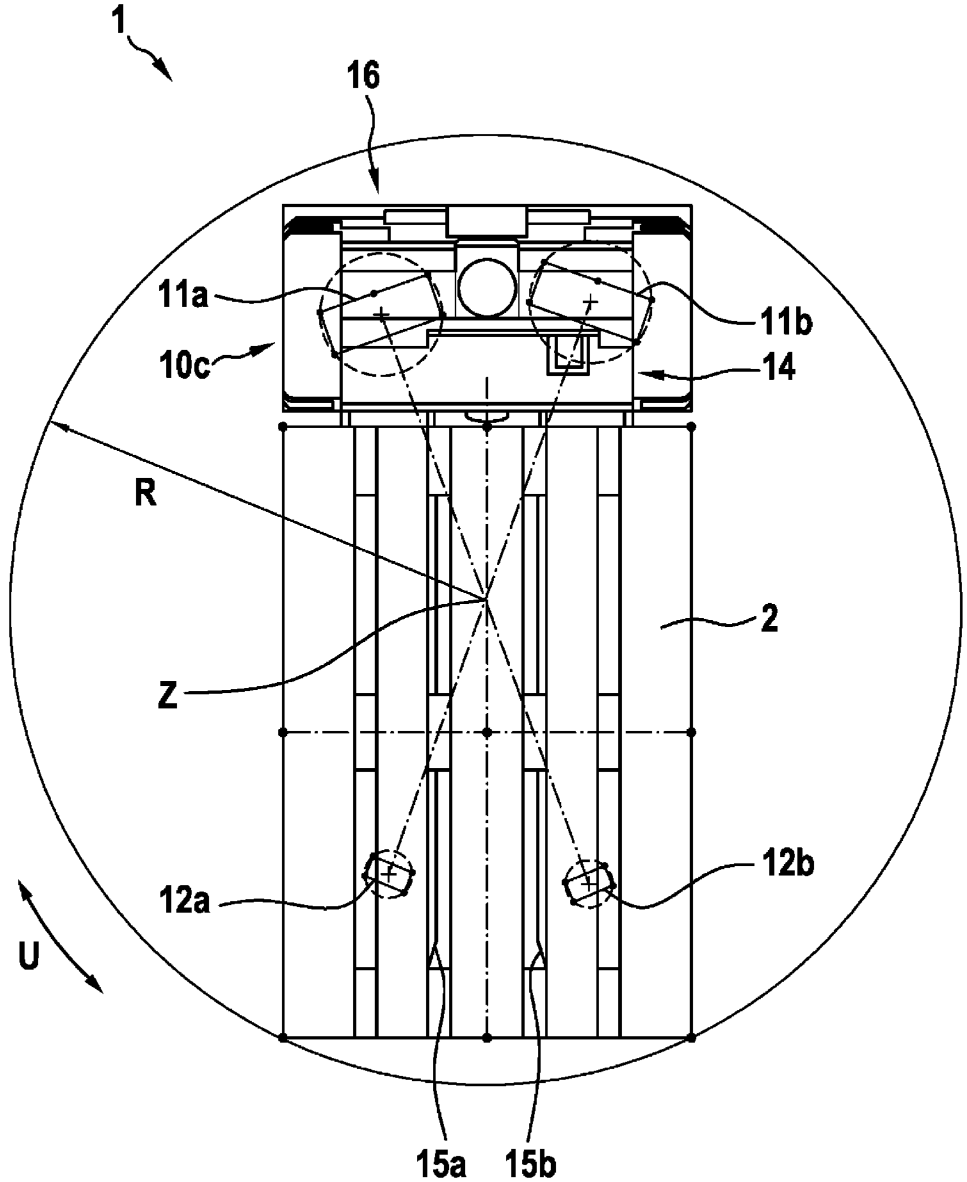
FIG. 7 shows a schematic plan view of the wheel arm forklift truck according to the invention in case of a rotation on the spot.
Figure 8:
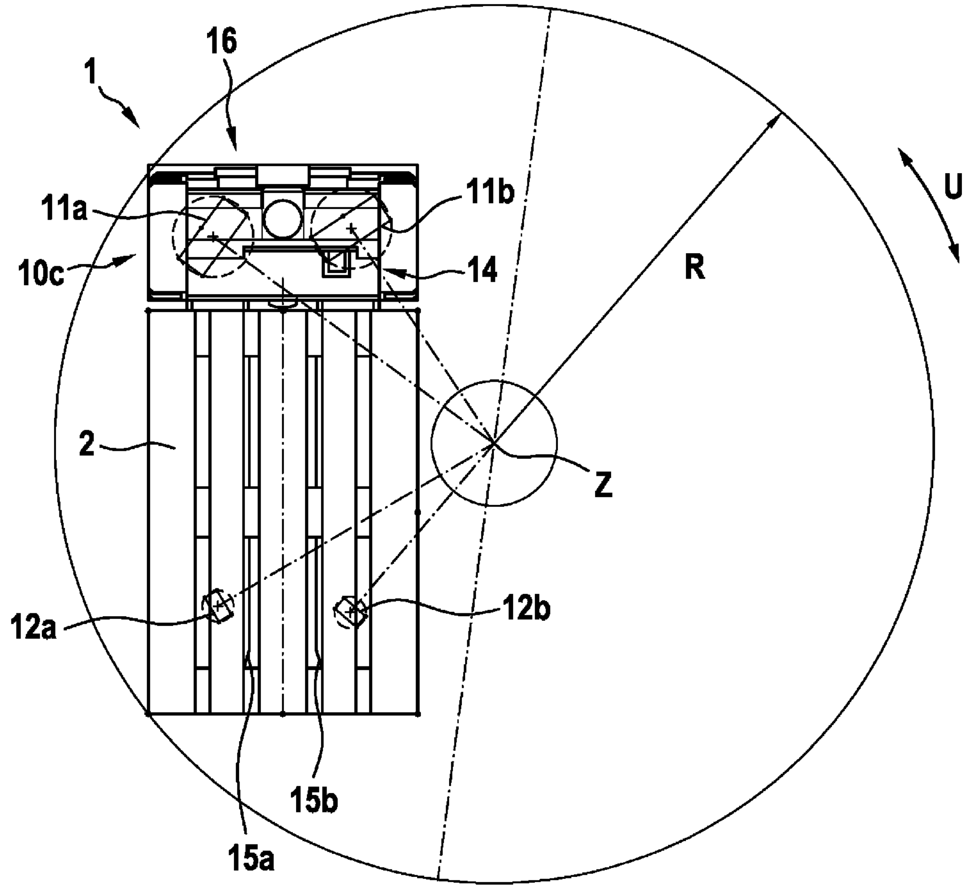
FIG. 8 shows a schematic plan view of the wheel arm forklift truck according to the invention in the case of a rotational movement about a point.

FIGS. 7 and 8 are based on cylindrical coordinates. In this case, the vertical direction Z can also be understood as vertical axis Z. A radial direction R extends away from the vertical axis Z perpendicular to the vertical axis Z. A circumferential direction U extends perpendicular to the radial 15 direction R and around the vertical axis Z.

A wheel arm forklift truck 1 according to the invention has a frame 10. The frame 10 is U-shaped in the horizontal plane X, Y and has a first, right-hand wheel arm 10_a_ and a second, left-hand wheel arm 10_b_, which run parallel to one another and extend in the longitudinal direction X away from a front end 10_c_ of the frame 10, which connects the two wheel arms 10_a_, 10_b_ fixedly to one another; see for example FIG. 3.

At the corners of the frame 10 or its front end 10*c* the front end 10*c* has two drive rollers 11*a*, 11*b* which are not aligned with one another in the transverse direction Y. The two drive rollers 11*a*, 11*b* can each be driven electrically rotationally, for example, and correspondingly transmit drive forces onto a ground (not shown) in both directions of rotation. Furthermore, both drive rollers 11*a*, 11*b* can be aligned by in each case a further drive, for example electrically, by 360° about their respective vertical axis, which runs in the vertical direction Z, and moreover in a targeted manner, which can be understood as steering. The rotational position can be detected by sensors (not shown). The two drive rollers 11*a*, 11*b* of the front end 10*c* are thus designed to be steerable.

Figure 1:
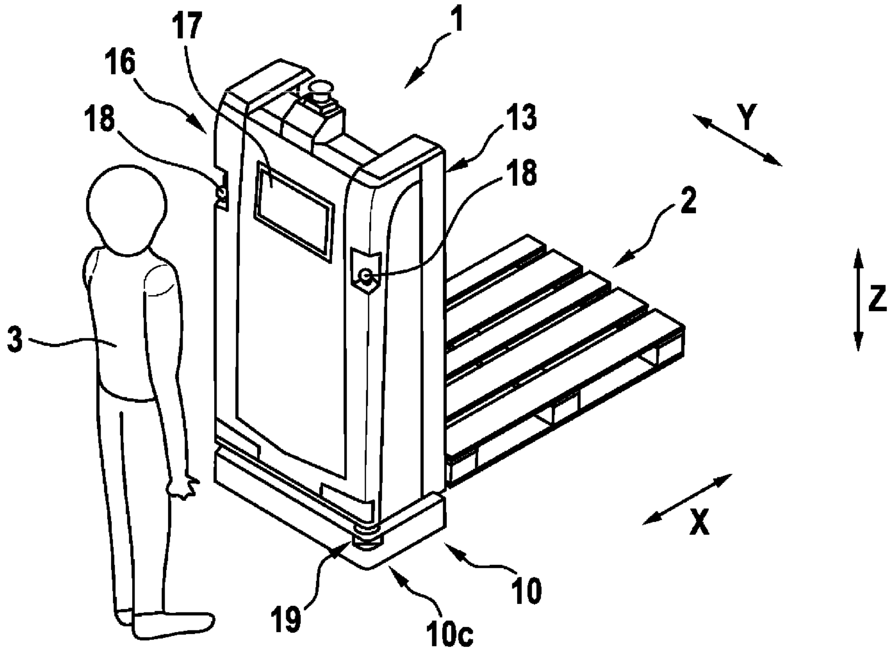
FIG. 1 shows a perspective schematic representation of a wheel arm forklift truck according to the invention with a picked-up transportation aid and a person shown obliquely from above and from the back.
Figure 2:
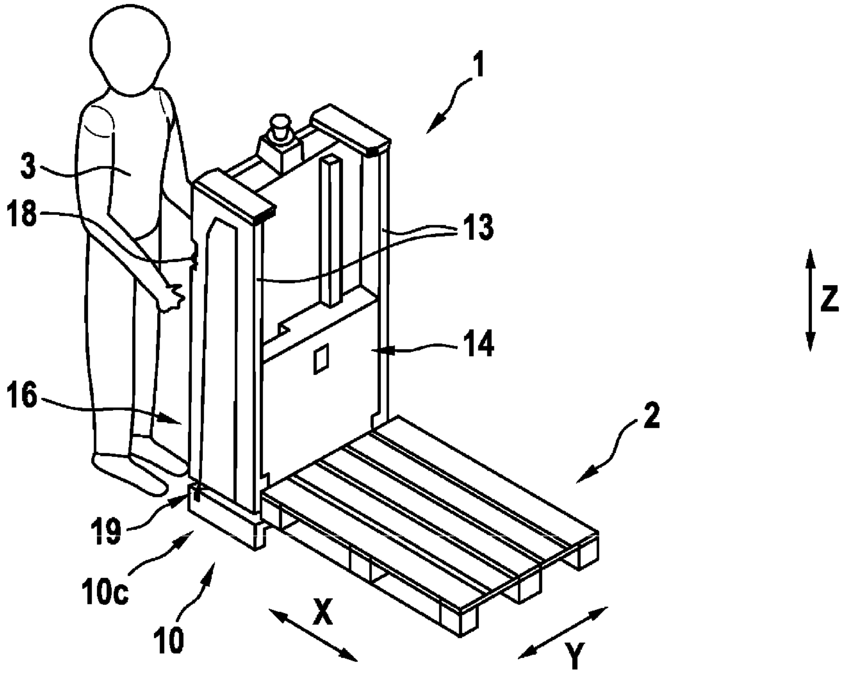
FIG. 2 shows the illustration of FIG. 1 obliquely from above and from the front.
Figure 3:
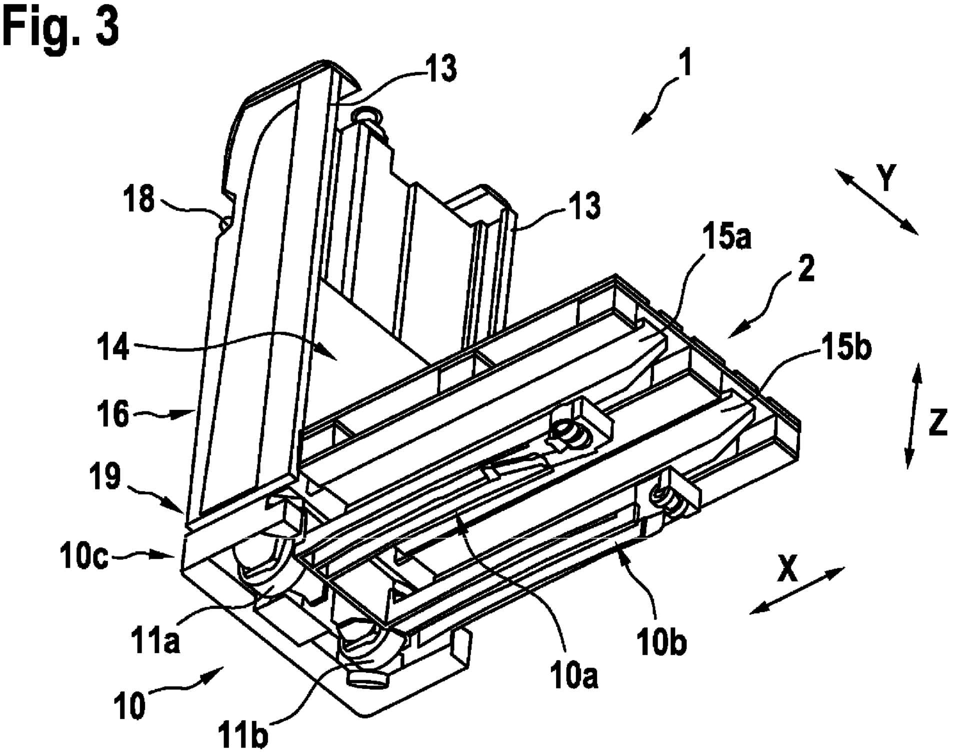
FIG. 3 shows the illustration of FIG. 1 obliquely from below and from the front.
Figure 4:
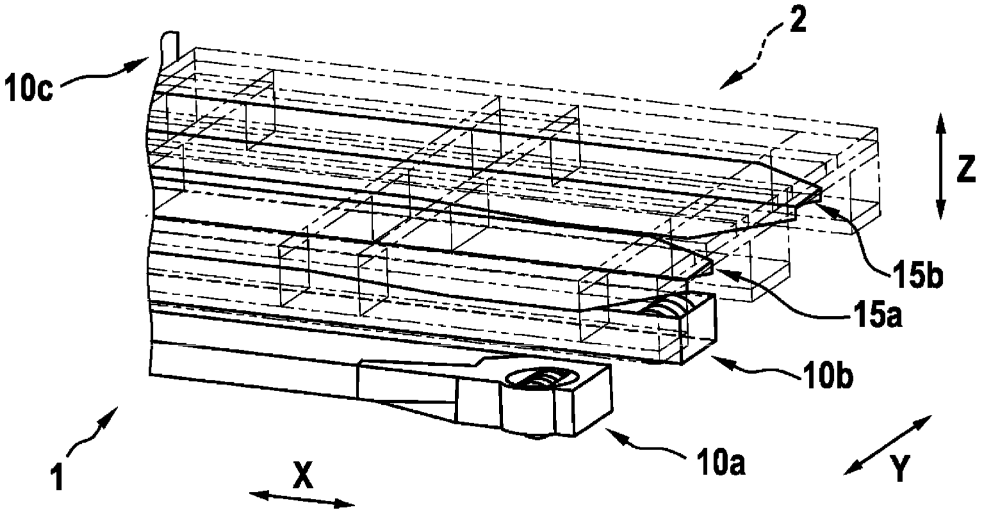
FIG. 4 shows a partially transparent detail view of FIG. 2.
Figure 5:
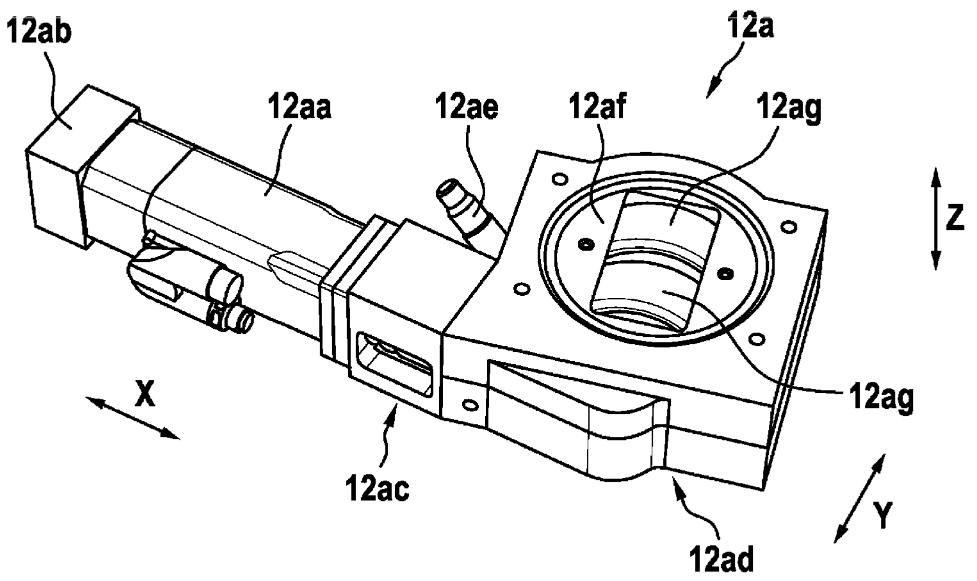
FIG. 5 shows a perspective schematic illustration of a first steerable roller of the first wheel arm of the wheel arm forklift truck according to the invention shown obliquely from above and from the front.
Figure 6:
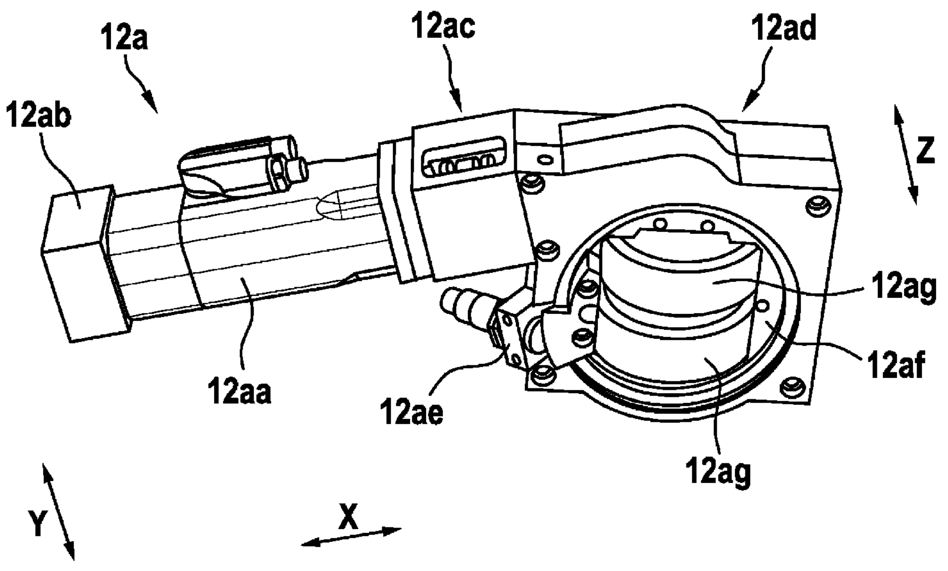
FIG. 6 shows the illustration of FIG. 5 obliquely from below and from the front.

The first wheel arm 10*a* has a first, right-hand roller 12*a* facing away from the front end 10*c* in the longitudinal direction X, which roller is also designed to be steerable; see for example FIGS. 3 and 4. This can be effected by means of an electric motor 12*aa*, which is arranged in the first wheel arm 10*a*, see for example FIGS. 5 and 6. The rotational movement of the electric motor 12*aa* is transmitted by means of a clutch 12*ac* to a gear unit 12*ad*, which can be designed as a worm gear unit 12*ad* or as a bevel gear unit 12*ad*. By means of the gear unit 12*ad*, a roller mount 12*af* can be rotated about its vertical axis, which extends in the vertical direction Z. The roller mount 12*af* has a pair of rollers 12*ag*, which are rotatably mounted around their common axis, which extends in the horizontal plane X, Y, within the roller mount 12*af*. The vertical axis of the roller mount 12*af* extends centrally between the two roller elements of the pair of rollers 12*ag* through the axis of rotation thereof. As a result, the first, right-hand roller 12*a* can be implemented as a steerable roller 12*a*, which can roll on the ground by the movement of the wheel arm forklift truck 1.

The rotational position of the first, right-hand steerable roller 12*a* can be set via the electric motor 12*aa* by a control unit (not shown) of the wheel arm forklift truck 1. This can take place in any angular position within 360° and above, i.e. the gear unit 12*ad* can rotate the roller mount 12*af* as desired about its vertical axis, which increases flexibility and speed when changing the angular position. A detection of the currently assumed angular position of the roller mount 12*af* can be effected by means of a first position sensor 12*ab* of the electric motor 12*aa* in the form of an incremental encoder 12*ab* and redundantly by means of a second position sensor 12*ae* below the gear unit 12*ad* and can be used by the control unit.

The second wheel arm 10*b* has a comparable second, left-hand roller 12*b*, which, however, is not steerable but is designed to rotate freely, that is to say rotate freely about its vertical axis and can also roll over the ground by the movement of the wheel arm forklift truck 1. Accordingly, the second, left-hand freely rotating roller 12*b* can follow the movements of the wheel arm forklift truck 1 or its steerable drive rollers 11*a*, 11*b* and align itself in the corresponding direction of movement. This can enable support of the second wheel arm 10*b* on the ground and at the same time enable the execution of any movements in the horizontal plane X, Y.

The wheel arm forklift truck 1 according to the invention can thus be used as a four-way industrial truck which, by means of the steering of the two steerable drive rollers 11*a*, 11*b* and the first, right-hand steerable roller 12*a*, can not only carry out translational movements in the longitudinal direction X, in the transverse direction Y and also obliquely in the horizontal plane X, Y, but also carry out rotational movements on the spot, see for example FIG. 7, or around a point, see for example FIG. 8. For this purpose, the arrangement of the first, right-hand steerable drive roller 11*a* and of the first, right-hand steerable roller 12*a* in the longitudinal direction X in alignment with each other and of the second, left-hand steerable drive roller 11*b* and of the second, left-hand freely rotating roller 12*b* in alignment with each other in the longitudinal direction X can be advantageous.

In contrast to this, it can be advantageous for the lateral movement in the transverse direction Y if the two steerable drive rollers 11*a*, 11*b* are not aligned with one another in the transverse direction Y and the two rollers 12*a*, 12*b* of the two wheel arms 10*a*, 10*b* are not aligned with one another in the transverse direction Y, i.e. are arranged offset to one another in the longitudinal direction X. This can facilitate the stability or the straightness of movement in the transverse direction Y.

The wheel arm forklift truck 1 further comprises a fork mount 14, which can be moved up and down between two vertical rails 13 of the front end 10*c* in the vertical direction Z on the two rails 13. Two fork arms 15*a*, 15*b* extend in parallel to one another from the fork mount 14 in the longitudinal direction X, which fork arms can also be referred to as fork prongs 15*a*, 15*b* or simply as prongs 15*a*, 15*b*. The first, right-hand fork arm 15*a* is formed to be hollow in the vertical direction Z on its underside such that the first right-hand fork arm 15*a* is lowered onto the first right-hand wheel arm 10*a* and can substantially surround the first right-hand wheel arm 10*a*, see for example FIG. 3. This applies correspondingly to the second, left-hand fork arm 15*b* and to the second, left-hand wheel arm 10*b*. As a result, a very flat design of the fork arms 15*a*, 15*b* can be implemented, in order to bring them underneath a transportation aid 2 such as, for example, a transport pallet 2 and to lift the transport pallet 2 in the vertical direction Z.

In the vertical direction Z above the front end 10*c*, a housing 16 is provided which, for example, surrounds the already mentioned control unit, a rechargeable electrical energy store (not shown) and the like, and which can protect against external influences and prevent access by persons 3. The housing 16 has a display element 17 in the form of a screen 17 or a display 17 for visually outputting information to a person 3 as a user 3, as well as operating elements 18 in the form of control levers 18 for operator inputs by the user 3, which are all positioned remotely from the fork mount 14 in the longitudinal direction. Furthermore, in the lower region of the housing 16, at both corners, the wheel arm forklift truck 1 has in each case an environment scanner 19 in the form of a laser scanner 19 facing away from the fork mount 14 in the longitudinal direction X, in order to acquire environmental information.

The control unit of the wheel arm forklift truck 1 is designed to operate the wheel arm forklift truck 1 automatically so that the wheel arm forklift truck 1 can be used as an AGV or FTF. The detected surroundings information of the laser scanner 19 can be used for this purpose.

LIST OF REFERENCE NUMERALS (PART OF THE DESCRIPTION)

R Radial direction
U Circumferential direction
X Longitudinal direction; depth; length
Y Transverse direction; width
Z Vertical direction; height; vertical axis
X, Y Horizontal, horizontal plane
1 Industrial truck, wheel arm forklift truck
10 (U-shaped) frame
10*a* First, right-hand wheel arm of the frame 10

10*b* Second, left-hand wheel arm of the frame 10
10*c* Front end of the frame 10
11*a* First, right-hand steerable drive roller
11*b* Second, left-hand steerable drive roller
12*a* First, right-hand steerable roller
12*aa* Electric motor of the first, right-hand steerable roller 12*a*
12*ab* First position sensor or incremental encoder of the first, right-hand steerable roller 12*a*
12*ac* Clutch of the first, right-hand steerable roller 12*a*
12*ad* Gear unit or worm gear unit or bevel gear unit of the first, right-hand steerable roller 12*a*
12*ae* Second position sensor of the first, right-hand steerable roller 12*a*
12*af* Roller mount of the first, right-hand steerable roller 12*a*
12*ag* Roller or roller pair of the first, right-hand steerable roller 12*a*
12*b* Second, left-hand freely running roller
13 Rails
14 Fork mount
15*a* First, right-hand fork arm: first, right-hand fork prong; first, right-hand prong
15*b* Second, left-hand fork arm, second, left-hand fork prong, second, left-hand prong
16 Housing
17 Display element; screen; display
18 Control elements; control lever
19 Environmental scanner; laser scanner
2 Conveying aid, transport pallet
3 Person; user

The invention claimed is:

1. A wheel arm forklift truck, comprising:

front end having at least two steerable drive rollers, at least one first wheel arm which extends in a straight line away from the front end and is fixedly connected to the front end, wherein the first wheel arm has at least one first roller, at least one first fork arm which is located above the first wheel arm in the vertical direction, and configured to be raised and lowered in the vertical direction, wherein the first roller of the first wheel arm is actively steerable through at least 90°, at least one second wheel arm which extends parallel to the first wheel arm in a straight line away from the front end and is fixedly connected to the front end, at least one second fork arm which is arranged parallel to the first fork arm in the vertical direction above the second wheel arm and which is configured to be raised and lowered together with the first fork arm in the vertical direction, wherein the second wheel arm has at least one second roller, wherein the second roller of the second wheel arm is passively rotatable through at least 90°.

2. Wheel arm forklift truck according to claim 1, characterized in that the first roller of the first wheel arm is steerable through 360°.

3. Wheel arm forklift truck according to claim 1, characterized in that the first roller of the first wheel arm is arranged on the end of the first wheel arm remote from the front end.

4. Wheel arm forklift truck according to claim 1, characterized in that the first roller of the first wheel arm has an electric motor which is designed to rotate a roller mount of the first roller, by means of a gear unit about the vertical direction as vertical axis, wherein the roller mount has at least one roller.

5. Wheel arm forklift truck according to claim 4, characterized in that the roller mount has at least one pair of rollers, the roller elements of which are designed and arranged axially symmetrical to the vertical axis.

6. Wheel arm forklift truck according to claim 4, characterized in that the first roller of the first wheel arm has at least one first position sensor which is designed to detect a rotational position of the roller mount, wherein the first roller has at least one second position sensor which is designed to detect the rotational position of the roller mount.

7. Wheel arm forklift truck according to claim 1, characterized in that the second roller of the second wheel arm is designed to be rotatable through 360°.

8. Wheel arm forklift truck according to claim 1, characterized in that the second roller of the second wheel arm is arranged on the end of the second wheel arm remote from the front end.

9. Wheel arm forklift truck according to claim 1, characterized in that the two steerable drive rollers are offset to one another in the longitudinal direction.

10. Wheel arm forklift truck according to claim 1, characterized in that the two rollers of the two wheel arms are offset to one another in the longitudinal direction.

11. Wheel arm forklift truck according to claim 1, characterized in that the first steerable drive roller of the two steerable drive rollers is arranged in the longitudinal direction in alignment with the first roller of the first wheel arm, and the second steerable drive roller of the two steerable drive rollers is arranged in the longitudinal direction in alignment with the second roller of the second wheel arm.

* * * * *